United States Patent [19]

Possati

[11] 4,370,812
[45] Feb. 1, 1983

[54] GAUGING HEAD FOR CHECKING LINEAR DIMENSIONS OF MECHANICAL PIECES

[75] Inventor: Mario Possati, Bologna, Italy

[73] Assignee: Finike Italiana Marposs S.p.A., S. Marino di Bentivoglio, Italy

[21] Appl. No.: 201,223

[22] Filed: Oct. 27, 1980

[30] Foreign Application Priority Data

Oct. 29, 1979 [IT] Italy .................. 3527 A/79

[51] Int. Cl.³ .............................. G01B 7/12
[52] U.S. Cl. .................. 33/169 R; 33/172 E
[58] Field of Search ............ 33/172 E, 172 B, 172 R, 33/174 L, 174 P, 148 H, 148 R, 148 J, 147 N, 169 R, 178 E, 178 R; 73/105

[56] References Cited

U.S. PATENT DOCUMENTS

| | | | |
|---|---|---|---|
| 1,928,457 | 9/1933 | Mershon et al. | 33/172 E |
| 3,123,943 | 3/1964 | Horsch et al. | 33/174 L |
| 4,279,079 | 7/1981 | Gamberini et al. | 33/143 L X |

FOREIGN PATENT DOCUMENTS

| | | |
|---|---|---|
| 487710 | 6/1938 | United Kingdom . |
| 1237813 | 6/1971 | United Kingdom . |
| 1332909 | 10/1973 | United Kingdom . |
| 1443036 | 7/1976 | United Kingdom . |

Primary Examiner—Harry N. Haroian
Attorney, Agent, or Firm—Stevens, Davis, Miller & Mosher

[57] ABSTRACT

A gauging head for checking linear dimensions of mechanical pieces includes a tubular outer casing having a square perimeter cross-section and an arm-set with a flat support element fixed to an internal side of the tubular casing. A movable arm supported by the support element passes through one of the ends of the tubular casing and carries a contact feeler movable substantially along a direction perpendicular to a longitudinal geometrical axis defined by the casing.

13 Claims, 4 Drawing Figures

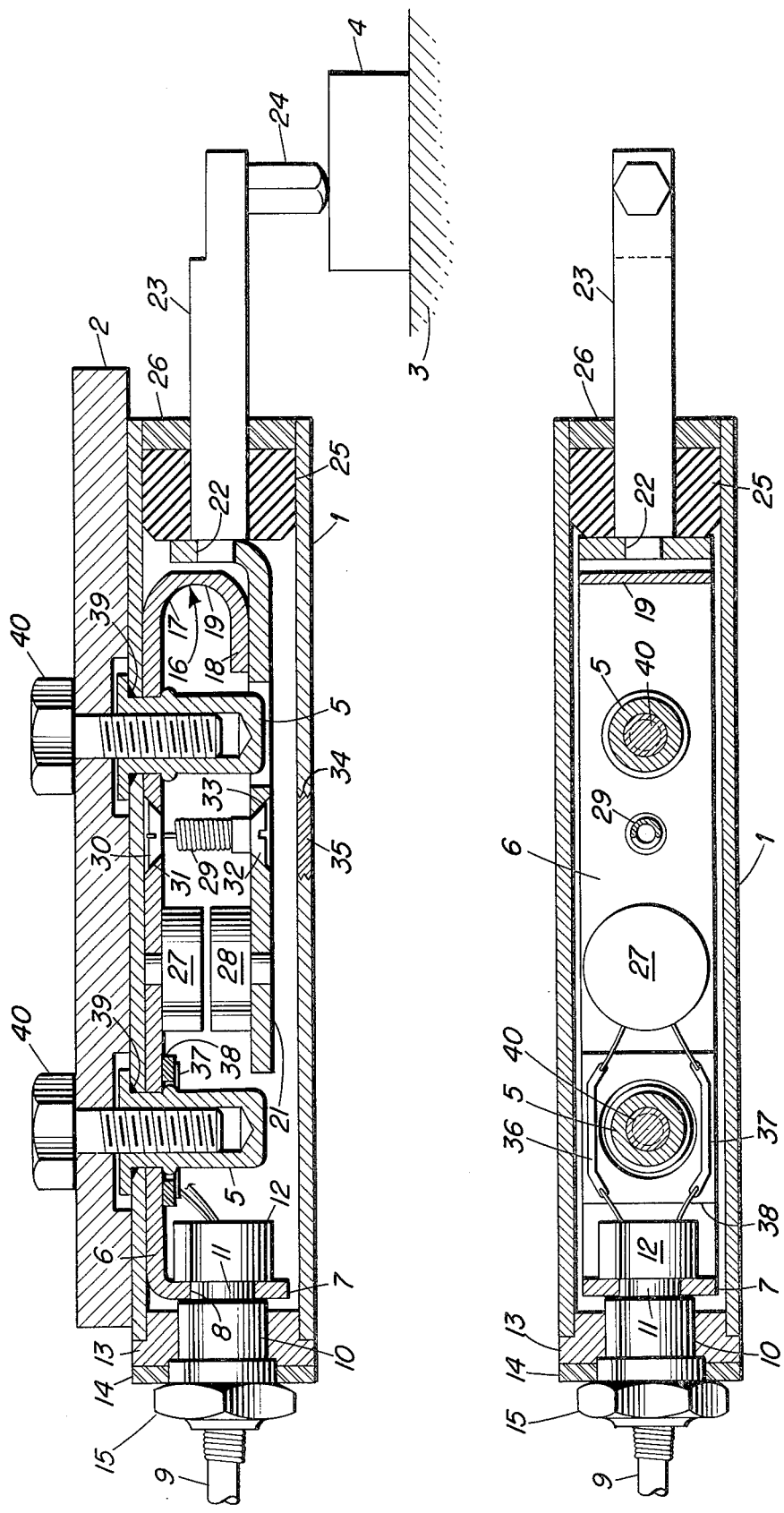

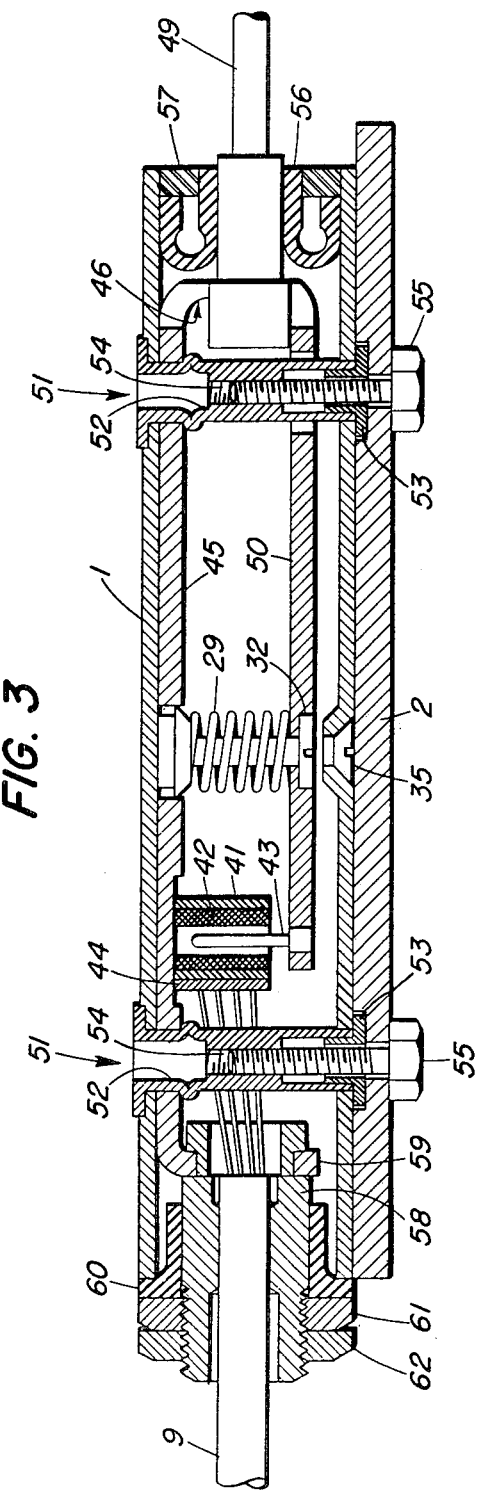
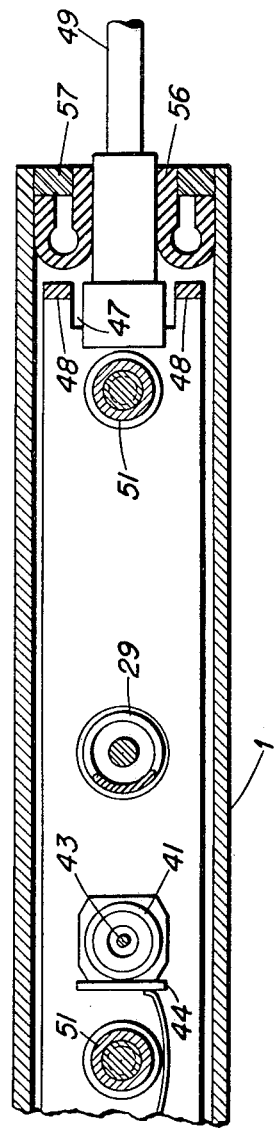

GAUGING HEAD FOR CHECKING LINEAR DIMENSIONS OF MECHANICAL PIECES

The present invention relates to a gauging head for checking linear dimensions of mechanical pieces, with an outer casing having lateral external faces that are substantially plane and parallel to a longitudinal geometrical axis of the casing; a movable gauging arm protruding from an end of the casing; a feeler fixed to the gauging arm to contact the surface of the piece to be checked, the feeler being movable along a direction that is substantially perpendicular to the geometrical axis; arm supporting means fixed to the casing; transducer means adapted to provide a signal depending on the position of the feeler; and sealing means for the closure of the casing.

Many types of gauging heads for the inspection of mechanical parts on bench fixtures and/or during the machine tool machining and/or for inspection along transfer lines are already known.

In most of these applications, it is required that the gauging heads, apart from guaranteeing high standards of accuracy and measurement repeatability, occupy little space and be of little weight, can be easily fixed to supports, ensure effective sealing and be relatively inexpensive.

In the known gauging heads the compromise among these requirements, that are partly contrasting, isn't always satisfying.

In fact the known gauging heads consist of many elements that are manufactured with great accuracy, are quite cumbersome and heavy, and are considerably expensive.

An object of the invention is to provide a gauging head that achieves a better compromise among the aforementioned requirements with respect to the known gauging heads.

This and other objects are obtained through a gauging head of the type outlined at the beginning of this description wherein, according to the invention, the casing basically consists of a single tubular element that is open at both its ends, the supporting means being fixed to an internal face of the tubular element and the sealing means being adapted to seal the ends or bases of the tubular element.

The invention is now described in detail with reference to the preferred embodiments illustrated in the accompanying drawings, given by way of non-limiting example wherein same parts, or equivalent ones, are marked with the same reference numbers and in which:

FIG. 1 is a vertical longitudinal section view of a gauging head for checking linear dimensions, according to a first embodiment of the invention;

FIG. 2 is a horizontal longitudinal section view of the head shown in FIG. 1;

FIG. 3 is a vertical longitudinal section view of a gauging head according to another embodiment of the invention;

FIG. 4 illustrates a partial view of a horizontal longitudinal section view of the gauging head shown in FIG. 3.

The gauging head shown in FIGS. 1 and 2 includes an outer casing consisting of a single tubular element 1 made of sheet steel, that is open at its ends and has cross-sections with outer and inner square perimeter.

Element 1, which consists of a seamless drawn pipe or tube is clamped, in a way that will be described hereinafter, to a support 2 fixed to a base 3 whereupon there is placed a piece 4 the height of which has to be checked or, more precisely, the height deviation from a nominal value.

To the upper inner wall (FIG. 1) of tube 1 there is clamped by means of two threaded blind hole upset rivets 5, a longitudinal flat element 6 the width of which is slightly smaller than that of the wall. Element 6 ends at one end with a wing 7 that extends in a transversal direction with respect to the geometrical axis of tube 1.

Wing 7 has a hole 8 for the passage of an electric cable 9. Cable 9 is housed in a sleeve 10, that is externally threaded and has a portion 11 inserted in hole 8 of wing 7. To portion 11 there is connected a member 12 providing a seat for housing a tear-resisting knot of cable 9.

A threaded cap 13 closes the end of tube 1. Cap 13 has a hole for seating sleeve 10. The sealing is ensured by a resilient gasket 14 that is compressed against the outer face of cap 13 by a nut 15.

At the other end of element 6 there is another wing 16 that forms, together with element 6 and with wing 7, a single piece of bent sheet steel for spring.

Wing 16 includes a first portion 17 that extends in a transversal direction and a second portion 18 that extends in a substantially axial direction. The first portion 17 has a section 19 of considerably smaller thickness making section 19 resiliently flexible so as to act as a fulcrum.

To the second portion 18 there is welded, by means of lateral seams, an L-shaped element 21 made of flat sheet steel, that has identical width as that of element 6.

The longer leg of the "L" extends in a substantially axial direction with respect to tube 1 and the shorter leg of the "L" extends in a substantially transversal direction.

In the shorter leg of element 21 there is a hole 22 wherein there is fixed an end of a cylindrical arm 23, that carries at its other end a feeler element 24 consisting of a threaded stem screwed to a hole of arm 23 and a feeler to contact the surface of piece 4.

At the shorter leg of element 21, tube 1 is sealed by means of a flexible rubber gasket 25 and a protective diaphragm 26 made of multicellular rubber. Gasket 25 and diaphragm 26 have holes for the passage of arm 23 and are adequately resilient in order to allow arm displacements, i.e. rotational movements about section 19. Normally these movements are of a small amplitude and it can therefore be assumed that feeler 24 substantially moves in a direction that is perpendicular to the longitudinal geometrical axis of tube 1.

The gauging head shown in FIGS. 1 and 2 also includes an inductive position transducer, of the so-called "pot-core" type that provides a measurement signal responsive to the position of arm 23 and consequently of the feeler. The first element, or "pot-core" 27 of the transducer contains an electrical winding and it is fixed to element 6, whereas the second element, or pot-core, 28, is coupled to element 21.

Between elements 6 and 21 there is a spring 29 that has an end connected to a truncated cone support 30 housed in a seat 31 defined by element 6. The other end of spring 29 is connected to a screw 32 that has its head located in a seat 33 formed in element 21. The head of screw 32 is accessible through a hole 34 in tube 1, that is sealed by a threaded cap 35. It is so possible, by turning the head of screw 32, to adjust the tension of spring 29 and consequently the contact force applied by the feeler to the surface of the piece to be checked.

The wires of cable 9 and those of the transducer element 27 are connected to conductive areas 36 and 37 that consist in printed circuits on a board 38. Board 38 is fixed to element 6 and it has a hole for the passage of one of rivets 5. For the passage of this rivet there are provided holes through element 6 and tube 1, whereas for the passage of the second rivet 5 there are holes through tube 1, element 6 and element 21.

The moving of feeler 24 towards piece 4 is delimited by the contacting of the two transducer elements 27 and 28 while that in the opposite direction is delimited by the contacting of the end of element 21 with the lower wall of tube 1.

The shape of section 19 and the action of spring 29 are such as to cause, under rest conditions, the two elements 27 and 28 to contact each other and to make the feeler move the maximum permissible amount along the measurement direction.

In the course of measurement taking, the action of spring 29 ensures the appropriate amount of contact force applied by the feeler to piece 4.

The distances of the feeler displacement line and of the axis of the transducer from section 19 are identical; this enables achieving a displacement of the feeler equal to that (in the opposite direction) of pot-core 28. Between the head of each rivet 5 and tube 1 there is a sealing ring 39.

The gauging head can be clamped to support 2 by means of two screws 40 that are screwed in the internal threads of the two rivets 5. In this way rivets 5, besides connecting element 6 with tube 1, i.e. the armset with the head casing, also allow the clamping of the latter to a support. The dimensions of the gauging head can be particularly small. For example, the cross-section of tube 1 can have external 12 mm sides and internal 10 mm sides. The width of elements 6 and 21 can be of 9 mm.

The gauging head can be filled, through hole 35, with silicone fluid, or another suitable damping liquid.

It is possible to disassemble in an easy way the gauging head by breaking first rivets 5 by using a drill, and then accomplishing any required repair work. Thereafter the gauging head is reassembled and by means of two new rivets element 6 is clamped to tube 1.

The gauging head shown in FIGS. 3 and 4 has some variants with respect to the one illustrated in FIGS. 1 and 2, mainly as far as the transducer, the movable arm-set and connecting rivets are concerned. There is foreseen the use of a differential-transformer position transducer, including a casing 41 with external plane faces, that houses the transformer windings 42, a movable core 43 and a printed circuit board 44 to which arrive the wires of cable 9 and those of the transducer. The transducer is of the type disclosed in Italian Patent Application No. 3365A/78 filed on Mar. 21, 1978, now available to public inspection.

With regard to the movable arm-set, instead of the two elements 6 and 21 of the gauging head shown in FIGS. 1 and 2, there is provided a single element 45 made of flat sheet steel for spring, substantially bent to a U-shape. Element 45 has a transversal portion 46 with a hole 47. Portion 46 comprises two sections 48 of smaller thickness, that act as fulcrums. A square-sectioned arm 49 passes through hole 47 and is welded to the movable side 50 of element 45.

Element 45 is clamped to a wall of tube 1 by means of two threaded rivets 51. One of the two rivets 51 passes through two holes defined by opposite walls of tube 1 and a hole obtained through the longitudinal flat portion of element 45 that is fixed to tube 1. The second rivet 51 passes through two holes defined by tube 1, one hole in the longitudinal flat portion of element 45 and a further hole defined by side 50.

Each rivet consists of two elements 52 and 53. Element 52 is upset to connect the longitudinal flat portion of element 45 to a wall of tube 1, the second element 53 is subsequently interference-fitted to element 52.

Element 52 has a thread 54, accessible through the heads of the two elements 52 and 53 of the rivet. Thus it is possible to clamp the gauging head, by screws 55, to a support 2 in correspondence with both the upper face and also (as shown in FIG. 3) the lower face of tube 1.

Arm 49 passes through a sealing gasket 56 and a protective membrane 57.

Cable 9 passes through a threaded sleeve 58 connected with a wing 59 of element 45. A gasket 60 is placed between sleeve 58 and tube 1. A nut 61 and a counternut 62 are screwed to sleeve 58 in order to keep it in position and compress gasket 60.

It is evident from the previous description and from the drawings that the elements of the illustrated gauging heads are particularly simple and inexpensive. The use of sheet steel elements, for manufacturing both the casing of the head and parts of the arm-set, and also the particular structures shown in the drawings allow the mechanical processings to be reduced and simplified. Most of the necessary processings are of an inexpensive type, like forming, shearing, drawing, riveting, etc.

Another basic advantage consists in the overall dimensions that, as formerly mentioned, can be reduced to dimensions similar to those of axial gauging heads of the type known as "pencil" or "cartridge".

What is claimed is:

1. A gauging head for checking linear dimensions of mechanical pieces, comprising: an outer casing having lateral external faces that are substantially plane and parallel to a longitudinal geometrical axis of the casing; a movable gauging arm protruding from an end of the casing; a feeler fixed to the gauging arm to contact the surface of the piece to be checked, the feeler being movable along a direction that is substantially perpendicular to said geometrical axis; arm supporting means fixed to the casing; transducer means adapted to provide a signal depending on the position of the feeler; and sealing means for the closure of the casing, wherein said casing basically consists of a single seamless drawn tubular element open at its ends and with four lateral walls having substantially a constant thickness, said supporting means being fixed substantially to a single internal face of the tubular element and including a first longitudinal element fixed to one of said walls of the tubular element, a second element, substantially longitudinal, arranged within the tubular element and carrying the gauging arm and the feeler, and a third connection element connecting the first and the second element, the third element having a section that is resiliently flexible to allow the moving of the second element about said section, and wherein the first and the third connection elements are parts of a single member of bent sheet steel, said sealing means being adapted to seal the ends of the tubular element.

2. The gauging head according to claim 1, wherein said tubular element has geometrical cross-section with internal and external perimeters having quadrilateral shapes and substantially constant internal and external dimensions.

3. The gauging head according to claim 2, wherein said second element of the supporting means substantially consists of a further member of bent sheet steel.

4. The gauging head according to claim 3, wherein the member and the further member have a width slightly smaller than that of said wall of the tubular element.

5. The gauging head according to claim 1 or claim 2, wherein said third element of the supporting means forms an integral part of said single member.

6. The gauging head according to one of claims 1 to 4, further including a spring coupled to the first element and the second element in order to determine the contact force applied by the feeler to the surface of the piece to be checked.

7. The gauging head according to one of claims 1 to 4, further including a spring coupled to the first element and the second element for determining the contact force applied by the feeler to the surface of the piece to be checked and a device coupling the spring to the second element and permitting adjustment of the spring tension.

8. The gauging head according to claim 3 or claim 4, wherein said third element of the supporting means is welded to the second element of the same means.

9. The gauging head according to one of claims 1 to 4, wherein said transducer means include a first transducer element fixed to said second element, a second transducer element fixed to said first longitudinal element and an electric cable and said sealing means include a first gasket fixed to an end of said tubular element, the gasket defining a hole for the passage of the electric cable, and a second gasket arranged at the other end of the tubular element, the second gasket defining a hole for the passage of said arm and being resiliently flexible in order to allow arm movements.

10. The gauging head according to one of claims 1 to 4, wherein said transducer means include two mutually movable transducer elements and an electric cable, and said first element of the supporting means includes an end that extends in a substantially perpendicular direction with respect to said internal face of the tubular element, this end defining a hole for the passage of the cable.

11. The gauging head according to claim 1, wherein said first, second and third element of the supporting means substantially consist of a single piece of bent steel sheet, that has a substantially U-shape.

12. The gauging head according to claim 11, wherein said third element of the supporting means defines a hole for the passage of said arm, the arm being fixed to a face of said second element of the supporting means this face being opposite to a face of the first element of the supporting means.

13. A gauging head for checking linear dimensions of mechanical pieces, comprising: an outer casing having lateral external faces that are substantially plane and parallel to a longitudinal geometrical axis of the casing; a movable gauging arm protruding from an end of the casing; a feeler fixed to the gauging arm to contact the surface of the piece to be checked, the feeler being movable along a direction that is substantially perpendicular to said geometrical axis; arm supporting means fixed to the casing, said supporting means including a first longitudinal element fixed to a wall of the tubular element, a second element, substantially longitudinal, arranged within the tubular element and carrying the gauging arm and the feeler, and a third connection element connecting the first and the second element, the third element having a section that is resiliently flexible to allow the moving of the second element about said section; transducer means, including two mutually movable transducer elements, adapted to provide a signal depending on the position of the feeler, one of the mutually movable transducer elements being fixed to said first longitudinal element; and sealing means for the closure of the casing, wherein said casing basically consists of a single integral seamless tubular element open at its ends and having four walls of a substantially constant thickness, the sealing means being adapted to seal the ends of the tubular element.

* * * * *